April 9, 1929.  E. CRAFT  1,708,719

SANITARY BREAD SLICER AND CONTAINER

Filed Aug. 9, 1927  2 Sheets-Sheet 1

Inventor
E. Craft

By Lacey & Lacey, Attorneys

April 9, 1929.  E. CRAFT  1,708,719
SANITARY BREAD SLICER AND CONTAINER
Filed Aug. 9, 1927  2 Sheets-Sheet 2
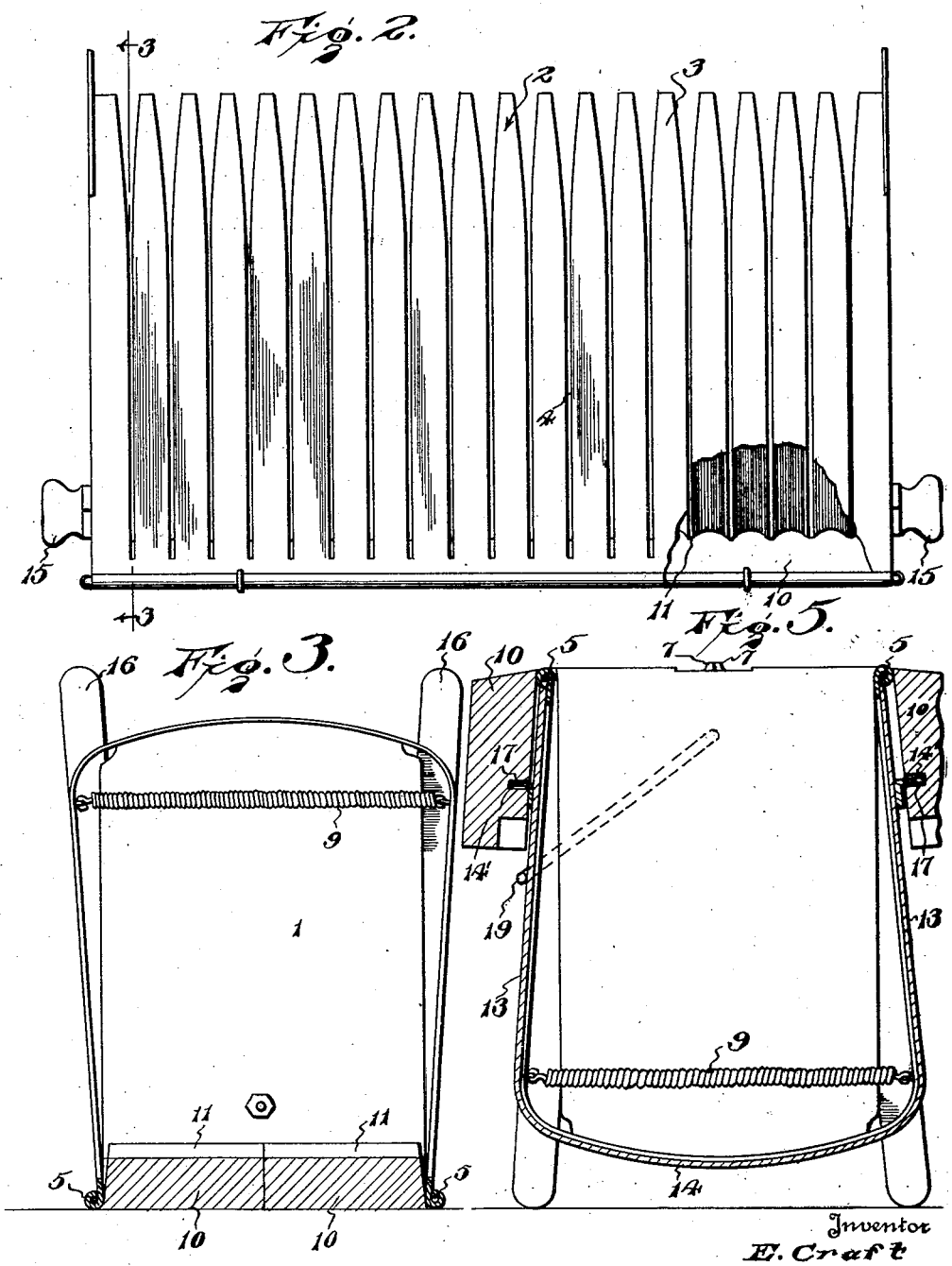
Inventor
E. Craft
By Lacey & Lacey, Attorneys Patented Apr. 9, 1929.

1,708,719

UNITED STATES PATENT OFFICE.

ELISHA CRAFT, OF WELLSBURG, WEST VIRGINIA.

SANITARY BREAD SLICER AND CONTAINER.

Application filed August 9, 1927. Serial No. 211,809.

The present invention is directed to improvements in bread slicers.

The primary object of the invention is to provide a device of this character so constructed that a loaf of bread, wrapped, or unwrapped, may be placed in the device and easily sliced.

Another object of the invention is to provide a device of this kind provided with a cover which, when in place upon the device after the bread has been sliced, will maintain the bread in a moist and fresh condition.

Another object of the invention is to provide a device of this character wherein a loaf of bread may be placed and maintained in proper condition before slicing thereof.

In the accompanying drawing:

Figure 2 is a side elevation of the device inverted, the cover being removed.

Figure 3 is a sectional view on line 3—3 of Figure 2.

Figure 5 is a transverse sectional view taken through Figure 1.

Figure 1:
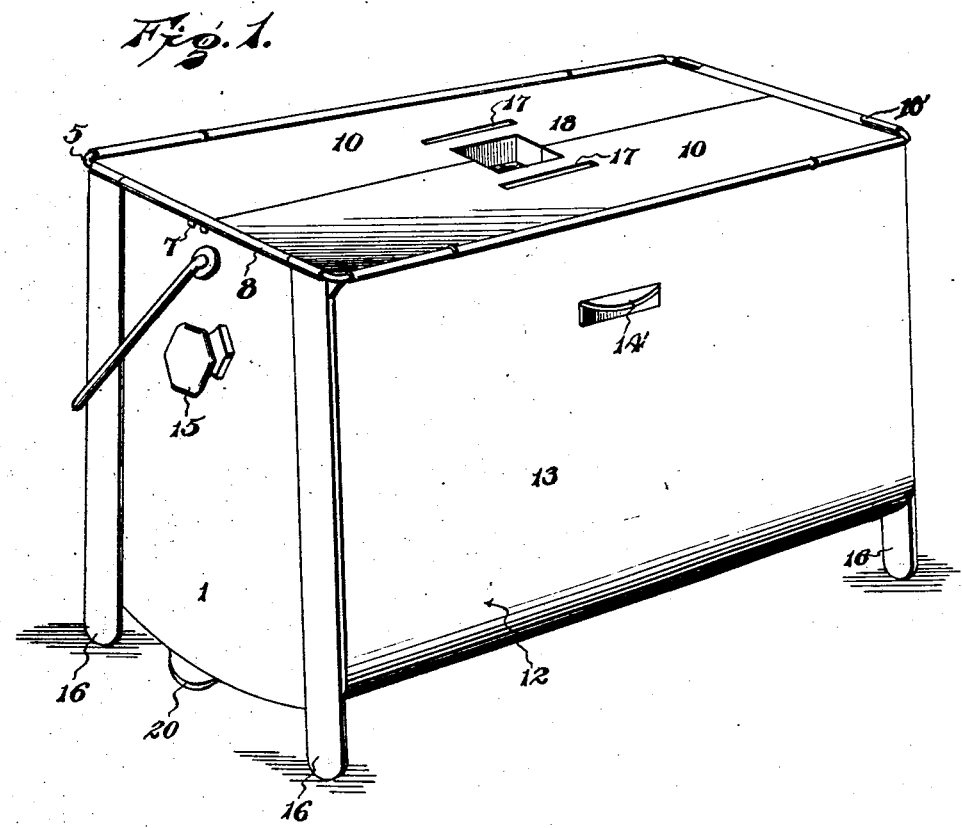
Figure 1 is a perspective view of the device in one of its positions.
Figure 4:
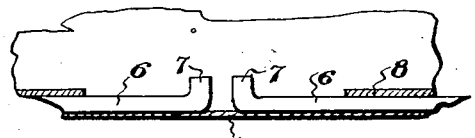
Figure 4 is a detail view of the rod terminals.

The device comprises a pair of end plates 1 and a knife guiding member 2 consisting of a plurality of spaced ribs 3, the spaces 4 permitting entrance of a knife blade to slice a loaf of bread contained in the member. The member has the lower edges of its sides crimped upon brace rods 5 which have inwardly directed ends 6 provided with lugs 7, said ends being slidable in the sleeves 8 formed upon the edges of the end plates 1. The lugs 7 limit the outward sliding movement of the ends of the rods. Coil springs 9 connect the sides of the guiding member and permit the same to yield in order that loaves of various sizes may be placed in the device.

Hingedly connected to the brace rods 5 are base boards 10 having transverse corrugations 11 therein which coincide with the spaces 4 between ribs 3 and it is upon these boards that the loaf of bread rests during the slicing thereof, the corrugations permitting the knife blade to pass fully through the loaf. The boards 10 have sleeves 10' carried by their edges for engaging the rods 5 to provide hinged connections therebetween.

The base boards, when in the position shown in Figure 3, constitute a rest for the loaf and when in the position shown in Figure 5 may constitute a cover for the guiding member. In Figure 5 the boards are shown in their open positions to permit slices of bread to be removed from the device. In order to keep a loaf of bread in a moist condition when in the member a cover 12 is provided and consists of a pair of sides 13 and a bottom 14, and since the cover is formed from sheet metal the inherent resiliency thereof will maintain the same in place upon the member 2 as shown in Figures 1 and 5. The sides 13 are provided with ears 14' and the end plates having knobs 15 thereon to permit the entire device to be conveniently lifted and turned, one of the knobs being preferably loosely mounted.

The member 2 is provided with legs 16 in order that the device can be supported, as shown in Figure 1, and at which time it forms in effect, a canister for the bread.

The boards 10 are provided with grooves 17 to accommodate the ears 14' when the boards 10 are open, as shown in Figure 5. Since the ears engage in the grooves 17 the possibility of the cover member 12 becoming accidentally dislodged when the bottom boards are in their open position is prevented.

The abutting edges of the boards 10 are provided with recesses 18 to permit the same to be readily opened. The ends of the cover 12 are provided with handles 20 to facilitate the removal of the cover when desired.

As shown in Figure 1, the cover 12 is in place and the loaf of bread, whether sliced or not will be protected, and will be kept in a moist and fresh condition. When it is desired to slice the loaf the cover is removed and the knife forced between the ribs 3, thus cutting the bread into uniform slices. While the loaf is being sliced it is obvious that it will rest upon the boards 10 and the device will be in the position shown in Figures 2 and 3. As soon as the bread has been sliced the device is inverted to a position as shown in Figure 1, and the slices can then be easily removed.

A handle bail 19 is provided and has its ends detachably connected to the end plates 1 in order that the device can be conveniently carried from place to place.

While I do not deem it desirable it will be of course understood that the end plates 1 can be removed, and in which event the loaf will be protected by the cover to some extent.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

Having thus described the invention, I claim:

1. A device of the class described comprising a member including a plurality of spaced ribs, said member having boards hingedly connected to the edges thereof, said boards serving as a rest for a loaf of bread when engaged in the member during the slicing of the loaf, and constituting a closure for the member when the member is inverted, and a cover detachably engaged with the member.

2. A device of the class described comprising a bread containing member, said member having boards hingedly connected thereto, said boards serving as a rest for a loaf of bread when engaged in the member when the member is in a bread slicing position, said boards constituting a cover for the member when said member is inverted.

3. A device of the class described comprising an invertible bread containing member including resiliently connected sides, and a resilient cover, corresponding in shape to the member, adapted to envelop said member when the member is inverted, the cover in the latter position of said member constituting a container for the member and the contents thereof.

4. A device of the class described comprising a member adapted to hold a loaf of bread in position to permit slicing thereof, and a cover corresponding in shape to the member for enveloping said member when inverted, the cover in the latter position of the member constituting a container for said member and the contents thereof.

5. A device of the class described comprising a U-shaped bread containing member having yieldable sides, said sides and bight portion of the member comprising spaced ribs, plates closing the ends of the member, and cooperative means carried by the plates and sides of the member for limiting the yieldable movement of the sides.

In testimony whereof I affix my signature.

ELISHA CRAFT. [L. S.]